United States Patent [19]

Dixon

[11] Patent Number: 4,862,778

[45] **Date of Patent: * Sep. 5, 1989**

[54] CHEEKSTRIP APPARATUS FOR USE WITH CUTTING CYLINDER KNIVES

[76] Inventor: Richard W. Dixon, 12424 Dewey Rd., Wheaton, Md. 20906

[*] Notice: The portion of the term of this patent subsequent to Feb. 14, 2006 has been disclaimed.

[21] Appl. No.: 238,609

[22] Filed: Aug. 31, 1988

Related U.S. Application Data

[63] Continuation of Ser. No. 180,630, Apr. 6, 1988, Pat. No. 4,784,031, which is a continuation of Ser. No. 4,422, Jan. 20, 1987, abandoned.

[51] Int. Cl.[4] .............................................. B23D 25/12

[52] U.S. Cl. ........................................ 83/117; 83/139; 83/142; 83/346; 101/226

[58] Field of Search ................ 83/116, 117, 138, 139, 83/142, 143, 346; 101/117, 224, 226, DIG. 19

[56] References Cited

U.S. PATENT DOCUMENTS

| | | | |
|---|---|---|---|
| Re. 17,892 | 10/1930 | Wood | 83/347 |
| 422,576 | 3/1890 | Eager | 83/142 |
| 928,256 | 7/1909 | Grissom | 83/142 |
| 1,082,986 | 2/1913 | Wilder | 83/139 |
| 1,766,807 | 8/1930 | Wood | 83/347 |
| 1,937,519 | 7/1933 | Lamatsch | 164/66 |
| 1,986,457 | 9/1935 | Wood | 164/66 |
| 2,038,336 | 1/1936 | Bachmann | 164/66 |
| 2,368,571 | 9/1945 | Sabo | 12/17 |
| 2,403,035 | 7/1946 | Whitson | 83/142 |
| 3,269,238 | 8/1966 | Whistler, Sr. et al. | 83/139 |
| 4,499,802 | 2/1985 | Simpson | 83/139 |
| 4,543,862 | 10/1985 | Levene et al. | 83/139 |

FOREIGN PATENT DOCUMENTS

| | | | |
|---|---|---|---|
| 1277043 | 10/1961 | France | 83/139 |
| 1087327 | 10/1967 | United Kingdom | 101/226 |

*Primary Examiner*—Clifford D. Crowder
*Attorney, Agent, or Firm*—Shapiro and Shapiro

[57] ABSTRACT

A cheekstrip having an upper part and lower part fits into a knife box assembly that is intalled in the rotary cutting cylinder of the folder used on a roll fed printing press. The upper part is made from a hard material and is connected to the lower part, which is made from a soft material such as open-cell sponge rubber. A knife is inserted between flat surfaces of two cheekstrips. The soft material applies correct pressure to the upper part, which contacts the paper against an adjacent member and clamps it securely, to enable the knife to make a quiet, consistent, distortion-free severance.

12 Claims, 2 Drawing Sheets

CHEEKSTRIP APPARATUS FOR USE WITH CUTTING CYLINDER KNIVES

This application is a continuation of Ser. No. 180,630, filed Apr. 6, 1988, now U.S. Pat. No. 4,784,031, which is a continuation of Ser. No. 004,422, filed Jan. 20, 1987 (abandoned).

BACKGROUND OF THE INVENTION

This invention relates to cheekstrip apparatus having an upper part made from a hard material such as polyurethane, and having a lower part made from a soft material such as open cell sponge rubber.

DESCRIPTION OF THE PRIOR ART

Cheekwoods are used by the printing industry as a paper holding component in a knife box assembly. The knife box assembly is installed in a slot provided in a rotary cutting cylinder located in the folder of a roll fed printing press. The rotary cutting cylinder is designed to cut the paper as it passes, in conjunction with another adjacent cylinder against which the paper is held by the spring pressed cheekwoods in order to clamp and hold the paper without undue bending, buckling, or distortion, so as to produce a clean and exact severance.

Components of a typical prior art knife box assembly 10 are shown in FIGS. 1 and 2. The knife box assembly comprises two knife box halves 10A and 10B, two cheekwoods 12A and 12B, and a knife 14 fixed between the halves of the knife box. Each half of the knife box comprises a channel 16A or 16B that is defined by a web 18 and a pair of flanges 20 and 22 extending in the same direction from opposite edges of the web. The halves of the knife box are disposed at opposite sides of the knife 14 with corresponding flanges extending toward each other, so as to define a hollow, elongated knife box. Flanges 22 support the base of the knife therebetween, with the knife bisecting the knife box and projecting therefrom through an opening at one side of the knife box between the flanges 20. Each cheekwood has a portion 24 of generally rectangular cross-section within the corresponding channel 16A or 16B and has a portion 26 that projects from the knife box between a flange 20 and the knife 14, as shown in FIG. 2. As is apparent, each cheekwood has a flat face that is juxtaposed with an opposed face of the knife, and each cheekwood rests on a series of coil springs 28 as shown.

In operation, the cheekwoods, in response to pressure applied to portions 26, move inwardly of the knife box so that the tip of the fixed knife 14 is exposed to cut paper as it moves past the knife box assembly.

In the prior art, cheekwoods typically have been made entirely from hard material such as phenolic, and they rest on the springs in the knife box assembly. Alternatively, prior art cheekwoods have been made entirely from a soft material such as sponge rubber, and used in the knife box assembly without springs.

A major problem with prior art cheekwoods is longevity. Printing presses having cheekwoods requiring springs are disabled when springs break. Also, the springs are relatively expensive to replace.

Printing presses using prior art cheekwoods made entirely from sponge rubber have had problems because the sponge rubber does not last very long in a high speed operation. This is due to the lack of durability of using only sponge rubber material.

OBJECTS AND SUMMARY OF THE INVENTION

An object of the present invention is to provide an improved cheekstrip for use in a high speed, roll fed, printing press.

Another object of the present invention is to provide a cheekstrip having a long service life.

A further object of the present invention is to provide a cheekstrip that is inexpensive and will operate on a high speed printing press at any desired speed.

An additional object of the present invention is to provide a replacement cheekstrip that can fit into knife box assemblies without modification of the knife box assemblies, and replace prior art cheekwoods.

In accordance with one aspect of the invention, in a roll-fed printing press knife box assembly that includes a hollow, elongated knife box with an opening at one side thereof through which a knife of the assembly projects, a cheekstrip comprises two elongated strip pieces that are contiguous along their length, one of said pieces being composed of a relatively hard material and the other of said pieces being composed of a relatively soft, resilient material, said one piece including a base portion adjacent to said other piece and a protrusion remote from said other piece, said base portion in combination with said other piece being shaped to occupy substantially the interior of the knife box at one side of the knife and said protrusion being shaped to project from said base portion through the opening of the knife box at said one side of the knife.

BRIEF DESCRIPTION OF THE DRAWINGS

The accompanying drawings, which are incorporated in and constitute a part of this specification, illustrate a preferred embodiment of the invention and, together with the description, serve to explain the principles of the invention.

DETAILED DESCRIPTION OF THE PREFERRED EMBODIMENT

Figure 3:
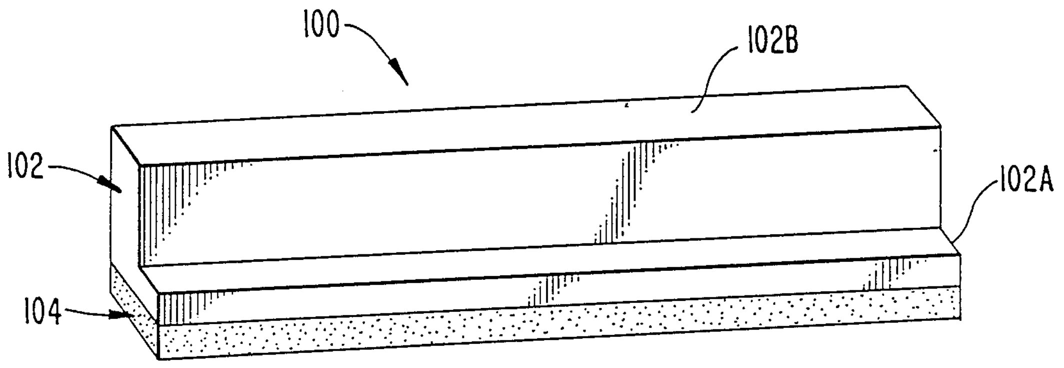
FIG. 3 is a perspective view of a cheekstrip of the invention.

Referring to FIG. 3, a preferred embodiment of a cheekstrip 100 of the invention is shown comprising a first elongated strip piece 102 of a hard solid material contiguous with a second elongated strip piece 104 of a soft material. Typically, the piece 102 is made from a material having the hardness of 90 A polyurethane. The piece 104 is made from a soft material such as open cell sponge rubber, usually neoprene. The piece 102 is connected to the piece 104 along their lengths.

Figure 1:
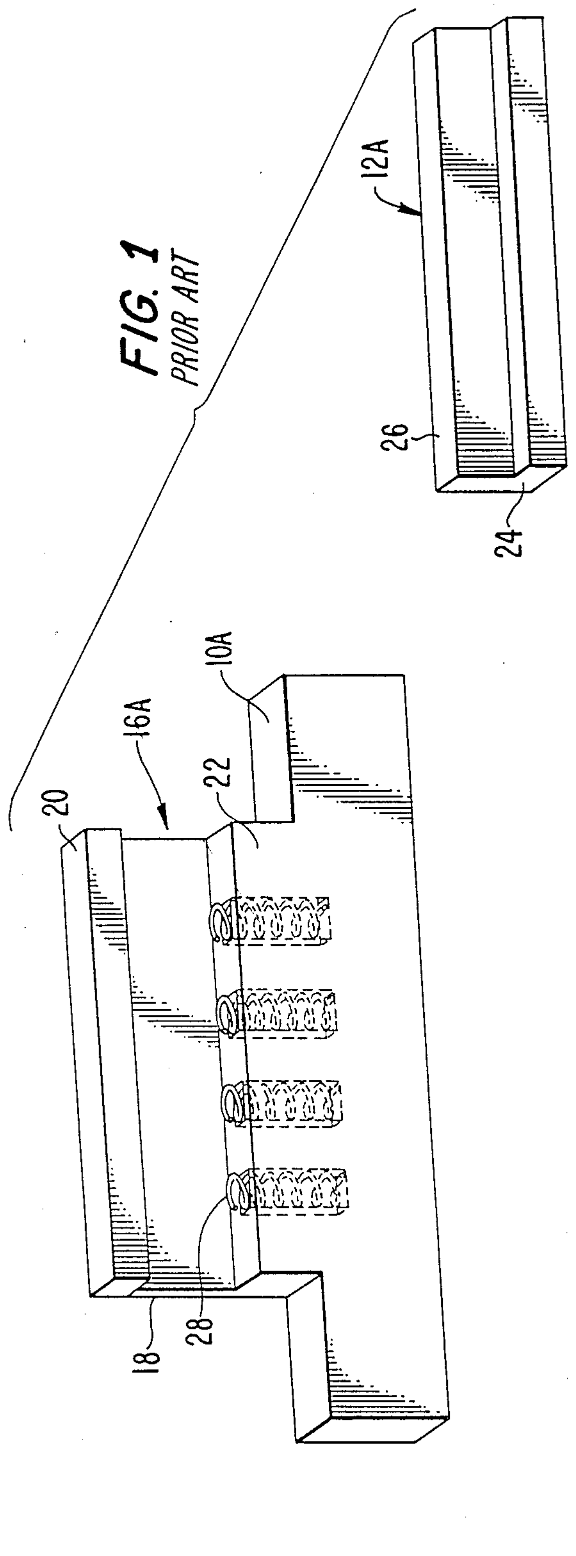
FIG. 1 PRIOR ART
FIG. 1 is a perspective view of one half of a prior art knife box assembly, illustrating springs and a prior art cheekwood.
Figure 2:
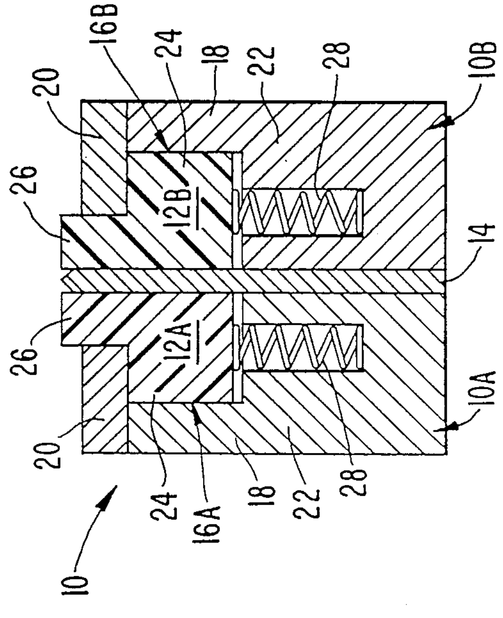
FIG. 2 PRIOR ART
FIG. 2 is a cross-section of a prior art knife box assembly having first and second cheekwoods resting on springs, with a knife inserted therein.
Figure 4:
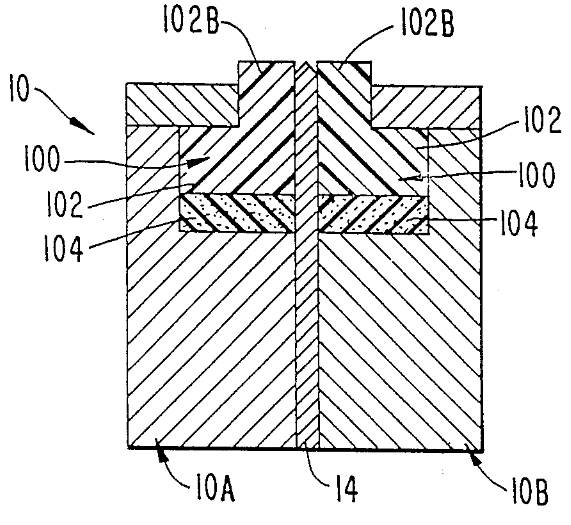
FIG. 4 is a cross-section of a knife box assembly having first and second cheekstrips of the invention with a knife inserted therein.

FIG. 4 shows the two halves 10A and 10B of a knife box assembly 10 clamped or fastened together with the respective flanges of the knife box halves facing each other as in FIG. 2. Two cheekstrips 100 fit into the knife box assembly at opposite sides of knife 14, with a flat face of each piece 102 juxtaposed with an opposed face of the knife, and with the height of the face of piece 102 in a direction extending away from piece 104 being coextensive with a substantial portion of the corresponding height of the opposed face of the knife in the interior of the knife box, as shown in FIG. 4.

As shown in FIG. 3, piece 102 of each cheekstrip includes a base portion 102A adjacent to piece 104 and a protrusion 102B remote from piece 104, the base portion 102A in combination with piece 104 being shaped to occupy substantially the entire interior of the knife box at one side of the knife, as shown in FIG. 4, and the protrusion 102B being shaped to project from the base portion 102A through the opening of the knife box at one side of the knife. The cheekstrips 100 require no springs in the knife box assembly.

In operation, the cheekstrips move in response to pressure applied to protrusions 102B of the cheekstrips, causing the tip of the fixed knife to be exposed and cut paper passing over the knife box assembly. The pieces 102 and 104 of each cheekstrip are connected to each other throughout their length. Piece 102 is preferably bonded to or molded into piece 104.

The shape of the cheekstrips 100 is similar to the cheekwoods used in the prior art. Note, however, that no springs are required in the knife box assembly with the cheekstrips 100 as used in the prior art, since the soft material acts as a release allowing the cheekstrips 100 to move in response to pressure being applied thereto.

The cheekstrips 100 as described herein may be used, for example, in web press folder knife boxes and eliminate the need for springs used with prior art cheekwoods and the problems associated therewith.

In practice, the present invention allows cheekstrips to be made at less cost than prior art cheekwoods and springs they replace. Since no springs are required, the cheekstrips have the advantages of quieter operation and longer life than systems having springs which break. Wear on cutting components is reduced. The cheekstrips will not tear the paper and can be used with any coated or uncoated paper. The cheekstrips can operate in a roll fed printing press folder at any speed desired. An additional advantage of the present invention is that it is not necessary to modify the knife boxes for using the replacement cheekstrips.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. In a roll-fed printing press knife box assembly that includes a hollow, elongated knife box with an opening at one side thereof through which a knife of the assembly projects, a cheekstrip comprising two elongated strip pieces that are contiguous along their length, one of said pieces being composed of a relatively hard material and the other of said pieces being composed of a relatively soft, resilient material, said one piece having a flat face adapted to be juxtaposed with an opposed face of said knife, with the height of said face of said one piece in a direction extending away from said other piece being coextensive with a substantial portion of the corresponding height of said opposed face of said knife in the interior of said knife box, said one piece including a base portion adjacent to said other piece and a protrusion remote from said other piece, said base portion in combination with said other piece being shaped to occupy substantially the entire interior of the knife box at one side of the knife and said protrusion being shaped to project from said base portion through the opening of the knife box at said one side of the knife.

2. A cheekstrip in accordance with claim 1, wherein said pieces are bonded to each other throughout their length.

3. A cheekstrip in accordance with claim 1, wherein said one piece is molded onto said other piece.

4. A cheekstrip in accordance with claim 1, wherein said one piece is formed of polyurethane material and said other piece is formed of sponge rubber material.

5. In a roll-fed printing press, a knife box assembly comprising a hollow, elongated knife box with an opening at one side thereof through which a knife of the assembly projects, and a pair of elongated cheekstrips extending longitudinally within the knife box at opposite sides of the knife, each cheekstrip comprising two elongated strip pieces that are contiguous along their length, one of said pieces being composed of a relatively hard material and the other of said pieces being composed of a relatively soft, resilient material, said one piece having a flat face juxtaposed with an opposed face of said knife, with the height of said face of said one piece in a direction extending away from said other piece being coextensive with a substantial portion of the corresponding height of said opposed face of said knife in the interior of said knife box, each cheekstrip occupying substantially the entire interior of the knife box at one side of the knife, with said one piece positioned to project through the opening of the knife box and with said other piece remote from said opening.

6. A knife box assembly in accordance with claim 5, wherein said relatively hard material is a plastic resin and said relatively soft, resilient material is a spongy material.

7. A knife box assembly in accordance with claim 6, wherein said plastic resin is polyurethane and said spongy material is sponge rubber.

8. A knife box assembly in accordance with claim 5, wherein said two pieces of each cheekstrip are bonded to each other throughout their length.

9. A knife box assembly in accordance with claim 8, wherein said one piece of each cheekstrip is molded onto said other piece of that cheekstrip.

10. A knife box assembly in accordance with claim 5, wherein the interior of the knife box at each side of the knife has a rectangular transverse cross section that is occupied by a corresponding cheekstrip.

11. In a roll-fed printing press knife box assembly that includes a hollow, elongated knife box with an opening at one side thereof through which a knife of the assembly projects, a cheekstrip comprising two elongated strip pieces that are connected to each other along their length, one of said pieces being composed of a relatively hard plastic resin material and the other of said pieces being composed of a relatively soft, resilient, spongy material, said one piece having a flat face adapted to be juxtaposed with an opposed face of said knife, with the height of said face of said one piece in a direction extending away from said other piece being coextensive with a substantial portion of the corresponding height of said opposed face of said knife in the interior of said knife box, said one piece including a base portion adjacent to said other piece and a protrusion remote from said other piece, said interior of said knife box having a rectangular transverse cross section and said base portion of said one piece in combination with said other piece being shaped to occupy substantially the entire interior of the knife box at one side of the 23 knife, said protrusion being shaped to project from said base portion through the opening of the knife box at said one side of the knife.

12. In a roll-fed printing press, a knife box assembly comprising a hollow, elongated knife box with an opening at one side thereof through which a knife of the assembly projects, and a pair of elongated cheekstrips extending longitudinally within the knife box at opposite sides of the knife, each cheekstrip comprising two elongated strip pieces that are connected to each other along their length, one of said pieces being composed of a relatively hard plastic resin material and the other of said pieces being composed of a relatively soft, resilient, spongy material, said one piece having a flat face juxtaposed with an opposed face of said knife, with the height of said face of said one piece in a direction extending away from said other piece being coextensive with a substantial portion of the corresponding height of said opposed face of said knife in the interior of said knife box, the interior of said knife box at each side of said knife having a rectangular transverse cross section, and each cheekstrip occupying substantially the entire interior of the knife box at a corresponding side of the knife with said one piece positioned to project through the opening of the knife box and with said other piece remote from said opening.

* * * * *